United States Patent
Lempel et al.

(10) Patent No.: US 9,940,791 B2
(45) Date of Patent: **\*Apr. 10, 2018**

(54) METAGAME REWARD POINT SYSTEM

(71) Applicant: Sony Interactive Entertainment LLC, San Mateo, CA (US)

(72) Inventors: Eric Lempel, Hayward, CA (US); Dawn Cindy De Guzman, Danville, CA (US); Taryn Hadfield, Foster City, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,906

(22) Filed: Oct. 17, 2016

(65) Prior Publication Data
US 2017/0032620 A1  Feb. 2, 2017

Related U.S. Application Data

(63) Continuation of application No. 13/960,673, filed on Aug. 6, 2013, now Pat. No. 9,468,842.

(51) Int. Cl.
*A63F 13/00* (2014.01)
*G07F 17/32* (2006.01)
(Continued)

(52) U.S. Cl.
CPC .......... *G07F 17/3281* (2013.01); *A63F 13/00* (2013.01); *A63F 13/30* (2014.09);
(Continued)

(58) Field of Classification Search
None
See application file for complete search history.

(56) References Cited

U.S. PATENT DOCUMENTS

| 8,262,468 B1 | 9/2012 | Vanbragt et al. |
| 8,371,932 B2 * | 2/2013 | Gagner ............... G07F 17/3223 463/25 |

(Continued)

FOREIGN PATENT DOCUMENTS

| KR | 20010096092 A | 11/2001 |
| KR | 20120077306 A | 7/2012 |

(Continued)

OTHER PUBLICATIONS

"MyAchievements." Xbox Live Rewards. Microsoft, n.d. Web. Jul. 17, 2013.

(Continued)

*Primary Examiner* — Jason Yen
(74) *Attorney, Agent, or Firm* — JDI Patent; Joshua Isenberg; Robert Pullman

(57) ABSTRACT

Aspects of the present disclosure include systems and methods for instituting a metagame point system that may be integrated into an online video game network for one or more video game platforms. The metagame points system may increase or decrease a user's point total based upon user performance across a plurality of different video game titles. In some implementations, the points may be transferable between users based upon user performance during multiplayer video game play. In further implementations, the points earned by a user may be redeemable for various rewards.

27 Claims, 13 Drawing Sheets

(51) Int. Cl.
  *A63F 13/46* (2014.01)
  *A63F 13/30* (2014.01)
(52) U.S. Cl.
  CPC .............. *A63F 13/46* (2014.09); *G07F 17/32* (2013.01); *G07F 17/3225* (2013.01); *G07F 17/3241* (2013.01); *G07F 17/3244* (2013.01)

(56) References Cited

U.S. PATENT DOCUMENTS

| | | | |
|---|---|---|---|
| 2002/0183105 A1* | 12/2002 | Cannon | G07F 17/32 463/16 |
| 2003/0203754 A1 | 10/2003 | Fujimoto et al. | |
| 2005/0143166 A1 | 6/2005 | Walker et al. | |
| 2005/0267610 A1 | 12/2005 | Shinoda | |
| 2006/0148567 A1* | 7/2006 | Kellerman | G07F 17/32 463/42 |
| 2007/0270210 A1* | 11/2007 | Song | G06Q 50/34 463/25 |
| 2008/0004117 A1 | 1/2008 | Stamper et al. | |
| 2009/0198741 A1 | 8/2009 | Cooper | |
| 2010/0250385 A1 | 9/2010 | Lempel et al. | |
| 2010/0261520 A1* | 10/2010 | Lempel | G07F 17/32 463/25 |
| 2011/0015976 A1 | 1/2011 | Lempel et al. | |
| 2011/0092282 A1* | 4/2011 | Gary | A63F 13/12 463/31 |
| 2011/0313827 A1 | 12/2011 | Lobb et al. | |
| 2012/0009994 A1 | 1/2012 | Cannon et al. | |
| 2012/0122563 A1 | 5/2012 | Walker et al. | |
| 2012/0150695 A1* | 6/2012 | Fan | G06Q 30/0641 705/27.1 |
| 2012/0329555 A1 | 12/2012 | Jabara et al. | |
| 2013/0005446 A1 | 1/2013 | Englman et al. | |
| 2013/0036373 A1* | 2/2013 | Alderfer | G06Q 10/103 715/757 |
| 2013/0090161 A1* | 4/2013 | Kislyi | A63F 13/69 463/29 |
| 2013/0125161 A1 | 5/2013 | Herby et al. | |
| 2014/0100994 A1 | 4/2014 | Tatzel et al. | |
| 2014/0370969 A1 | 12/2014 | LeMay et al. | |

FOREIGN PATENT DOCUMENTS

| | | |
|---|---|---|
| KR | 20120139262 A | 12/2012 |
| KR | 20130036855 A | 4/2013 |
| KR | 20130082987 A | 7/2013 |
| RU | 2226417 C2 | 4/2004 |
| RU | 76573 | 9/2008 |
| WO | 2010114579 A1 | 10/2010 |
| WO | 2011011203 A1 | 1/2011 |

OTHER PUBLICATIONS

Brian Crecente, Playstation Rewards Fans With New Loyalty Program, Oct. 27, 2010, http://kotaku.com/5673849/playstation-rewards-fans-with-new-loyalty-program.
Final Office Action for U.S. Appl. No. 13/960,673. dated Feb. 3, 2016.
International Search Report and Written Opinion for International Application No. PCT/US2014/047893, dated Dec. 4, 2014.
Major Nelson, Introducing the Xbox Live Rewards program, Dec. 1, 2010, http://majornelson.com/2010/12/01/introducing-the-xbox-live-rewards-program/.
Major Nelson, Play to Earn from Xbox Live Rewards, Mar. 28, 2013, http://majornelson.com/2013/03/28/play-to-earn-from-xbox-live-rewards/.
Non-Final Office Action for U.S. Appl. No. 13/960,673, dated Aug. 24, 2015.
Notice of Allowance for U.S. Appl. No. 13/960,673, dated Jun. 22, 2016.
Slabaugh, Brett. "Xbox One Achievements Are About More Than Gamerscore." www.escapistmagazine.com. Alloy Digital LLC, Jun. 13, 2013. Web. Jul. 31, 2013.
Warr, Phillipa. "Microsoft Revamps, Relaunches Xbox Live Rewards with Cash in Mind." Wired UK. N.p., Sep. 5, 2013. Web Sep. 6, 2013.
Office Action for Korean Patent Application No. 10-2016-7005659 dated Mar. 2, 2017.
Office Action dated Oct. 31, 2017 for Korean Patent Application 10-2016-7005659.
Office Action dated Aug. 29, 2017 for Russian Patent Application No. 2016 107 979.

\* cited by examiner

Multiplayer Challenge Request

Challenger: Username1

Match Type: Player vs. Player
Proposed Wager: 300 Points
Counter Wager: ___
Incentive: 600 Points Input Counter Wager:

↕ 500 Points

[ Accept ]  [ Counter ]  [ Decline ]

---

Challenge Accepted

Username1 accepted your 500 point counter wager.
Your game will begin shortly.

INCENTIVE: 1000 Points

FIG. 3B

Multiplayer Challenge Request

Challenger: Username2

Match Type: Player vs. Player
Proposed Wager: 300 Points
Counter Wager: 200
Incentive: 500 Points Input Counter Wager:

$\updownarrow$ ___ Points

| Accept | Counter | Decline |

Challenge Accepted

Username1 accepted your 200 point counter wager.
Your game will begin shortly.

INCENTIVE: 500 Points

FIG. 3C

Multiplayer Challenge Request

Team1 wants you to join their
team to battle Team2

Match Type: Team vs. Team
Player Contribution: 500 Points
Incentive: 5,000 Points to Winning Team
(1,000 points per player)

[ Accept ]   [ Decline ]

Challenge Accepted

You have accepted a Team Match.
Your game will begin shortly.

INCENTIVE:
5000 Points to Winning Team
(1,000 Points per player)

FIG. 3D

Tournament Multiplayer Event

GameTitle1: TournamentName1

Tournament Type:   Single Elimination
Tournament Size:   16 Players
Entry:             50 points per player
Incentive:   1st Place Winner – 500 Points
             2nd Place Winner – 200 Points
             3rd Place Winner – 100 Points Registration Starts:  Wed 3 Sept 2014, 11:00 AM EDT
Registration Ends:    Wed 12 Sept 2014, 11:30 PM EDT Tournament Bracket Play Starts:  Sat 13 Sept 2014, 3:00 PM EDT
Tournament Bracket Play Ends:    Wed 24 Sept 2014, 9:00 PM EDT

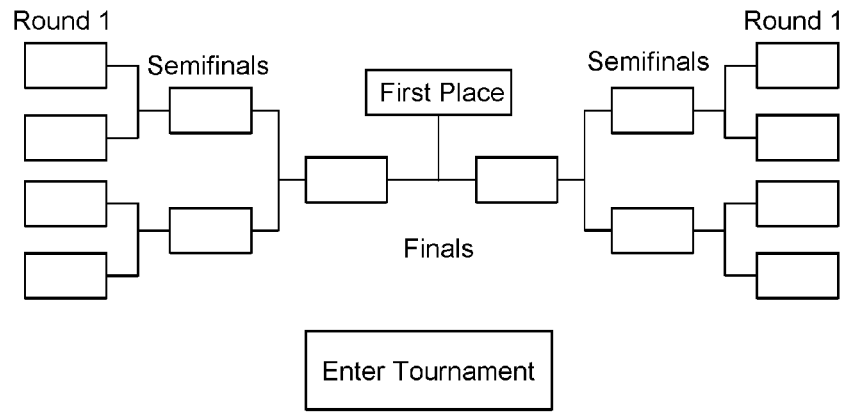

Enter Tournament

FIG. 3E

METAGAME REWARD POINT SYSTEM

CLAIM OF PRIORITY

This application is a continuation of U.S. patent application Ser. No. 13/960,673, filed Aug. 6, 2013 (U.S. Pat. No. 9,468,842), the entire contents of which are incorporated herein by reference.

FIELD

Aspects of the present disclosure relate to online computer entertainment networks. In particular, aspects of the present disclosure relate to a metagame point system for a video game platform.

BACKGROUND

As computer and network communication technologies have continued to advance, a variety of forms of entertainment have become increasingly intertwined with computers and the internet. For example, many people purchase goods and services over the internet; download and stream digital content such as movies, television shows, photos, preview trailers, and the like; interact socially online through a variety of social networking platforms; play games online; and more.

One form of computer entertainment in which advances in internet connectivity have had a particularly significant impact is video games. Before such advances, multiplayer gaming was a limited experience often confined to a local environment between two to four users playing a game through a common platform, e.g., a single videogame console. With the proliferation of internet technologies, multiplayer gaming has been transformed into a network that connects players across vast distances, and the possibilities for multiplayer competitive and cooperative play within any particular gaming title have increased greatly as a result.

In addition, with the widespread adoption of online gaming, a variety of techniques have been developed to support the online gaming experience and enhance user interaction through video game networks. For example, many video game networks include online features that support the video game experience, such as, e.g., online leaderboards through which users can compare rankings, accomplishments, etc.; online video game stores that provide access to purchasable and downloadable game content, such as full games, game trials, and add-ons such as new characters, maps, and levels, etc.; social networking features that allow users to create avatar representations of themselves in the video game environment; and the like.

Moreover, some video game service providers have expanded their network services beyond pure video game play and video game related support functions to attempt to integrate various other forms of computer entertainment into the experience. For example, some video game network interfaces allow users to access other computer entertainment content through a respective video game platform. One such example is a video game console that includes a home screen before booting up any particular video game title, which provides access to applications that provide users with various other computer entertainment content, such as downloadable music, movies and television shows, streaming services, and integration with existing social network services.

Despite the above advancements, there is an ever evolving need for increased user involvement in video games and online computer entertainment experiences. It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIGS. 3B-3E are schematic diagrams of GUIs depicting various multiplayer game event lobbies in accordance with aspects of the present disclosure.

DETAILED DESCRIPTION

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

Introduction

According to aspects of the present disclosure, systems and methods for instituting a metagame point system that may be integrated into an online network for one or more video game platforms. The metagame point system may change a user's point total based upon user performance across a plurality of different video game titles and online network activity including but not limited to commerce, consumption of music, movies and TV, social networking and platform engagement. In some implementations of the present disclosure, metagame points earned by a user may be redeemable for various rewards and/or transferable between users based on various user actions, including multiplayer gaming outcomes.

Illustrative Implementations

Figure 1A:
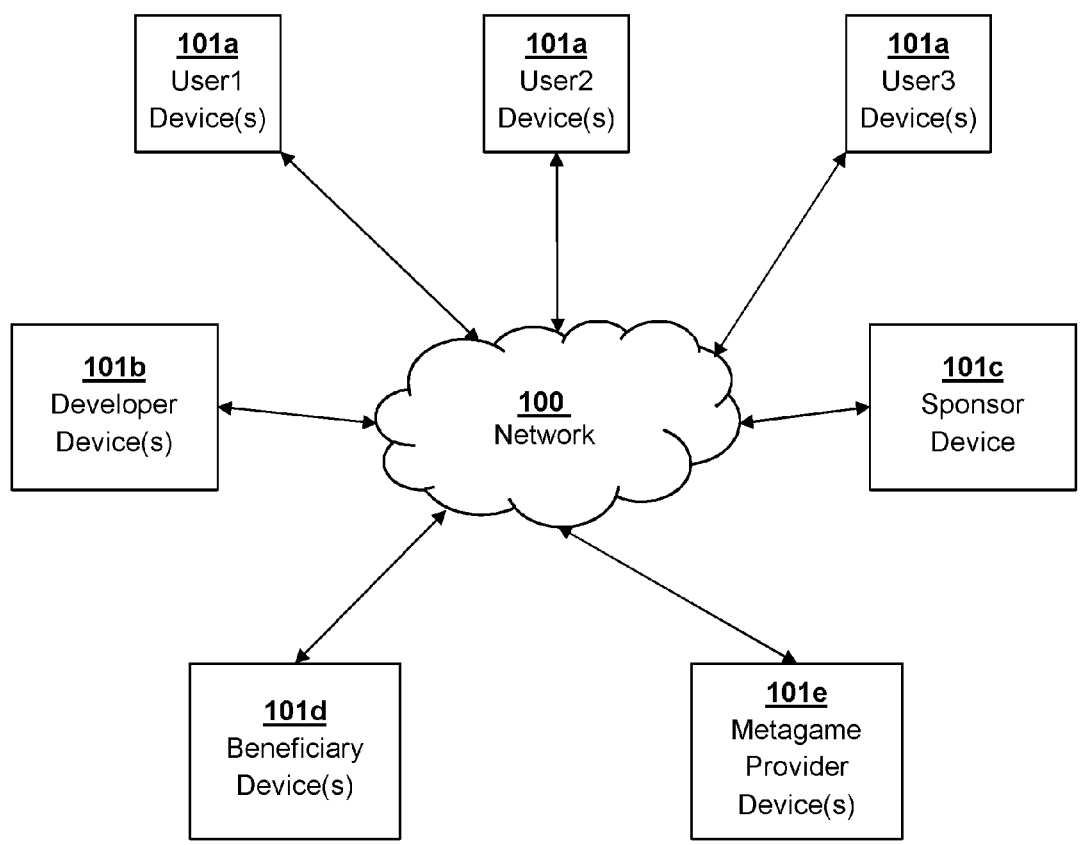
FIG. 1A is a schematic diagram depicting a network of computing devices in accordance with aspects of the present disclosure.

According to aspects of the present disclosure, a plurality of entities may participate in a point system metagame through one or more corresponding computing devices connected over a network 100. FIG. 1A depicts a schematic illustration of some computing devices that may participate in features of metagaming in accordance with the present disclosure.

In implementations of the present disclosure, a plurality of computing devices 101a-e may communicate over a network 100. The plurality of computing devices connected over the network may include, e.g., one or more user computing devices 101a for each user participating in the metagame. Each of the users' computing devices 101a may include one or more computing devices providing a video game platform through which the user may participate in core video game play for the video game platform. The users may also participate in metagaming aspects in conjunction with core game play through the user computing devices 101a. Each of the users' client devices 101a may also include one or more general computing systems having a network interface for participating in further aspects of the metagame system outside of a core game play environment, e.g., through an application or online webpage that may access a user account associated with the metagame.

The network 100 may also include one or more game developer and/or game publisher computing devices 101b, which may connect game publishers and/or game developers to provide support for various aspects of metagaming in accordance with aspects of the present disclosure. The network 100 may also include one or more sponsor computing devices 101c, which may connect point sponsors, which may also include game developer/publishers as well as other entities, in order to provide support for various aspects of metagaming in accordance with the present disclosure. The network 100 may also connect one or more beneficiary 101d computing devices for beneficiaries who may be receive funding related to various user point redemptions by users, in accordance with various aspects of the present disclosure. One or more metagame provider computing devices 101e may also provide support for the metagaming process by connecting the various different entities, tracking and changing user point totals, providing rewards when points are redeemed by the users, and various other functions.

It is noted that the network 100 may be a distributed network of computing devices that may be implemented in a variety of ways to connect the different participants in a metagame process, such as client/server relationship, cloud computing, peer-to-peer and the like.

Figure 1B:
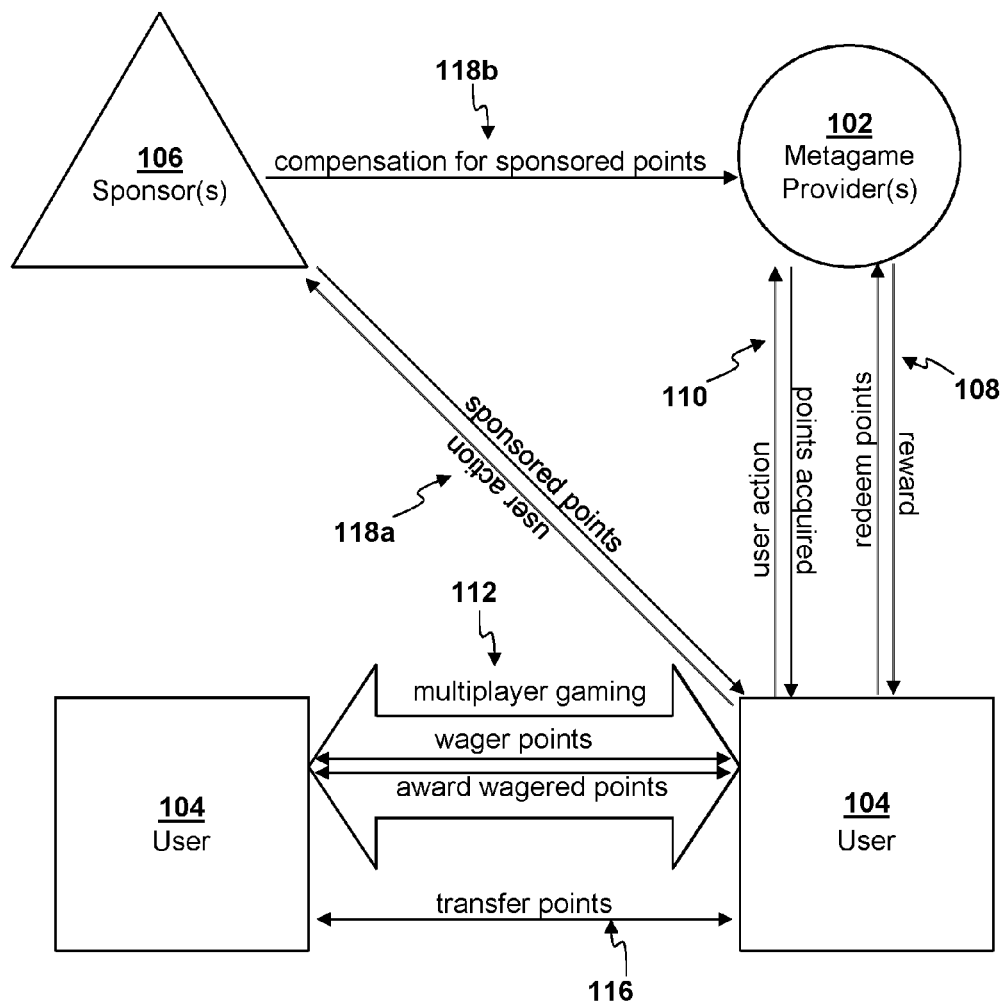
FIG. 1B is a schematic diagram depicting a network of metagame participants in accordance with aspects of the present disclosure.

As depicted in FIG. 1B, a plurality of entities may participate in a network 100 that includes a video game-based point system provided by a metagame provider 102. Various aspects of the network 100 may be implemented by programming executed by one or more computing devices in a distributed network of computing systems through which the metagame provider 102, users 104, sponsors 106, and other entities (not pictured) may participate in a point system maintained by the metagame provider 102. In implementations of the present disclosure, a point system may include point transactions (as shown by the arrows in FIG. 1B), some or all of which may be configured to be performed through computing devices over a telecommunications network, such as, e.g., the Internet. Portions of a framework that supports the transactions, including hardware and/or software components may be made available by the service provider 102.

Each of the users 104 may participate in the point system through one or more computing devices, which may include one or more video game systems that are configured to run gaming titles developed for one or more video game platforms that support that point system. The users 104 may acquire and lose points based on various user actions pre-defined to trigger a change in point totals for the user.

Points may be acquired by each of the users 104 across a plurality of different gaming titles based on gaming events occurring during game play, and points acquired by each user 104 in the different gaming titles may be consolidated in a user account for tracking users' point totals across different gaming titles.

According to aspects of the present disclosure, point totals for users 104 may change in a variety of ways. According to some aspects, user actions that trigger changes in point amounts include core game play events, including events that may occur in single player game play, multiplayer game play, online game play, offline game play, and the like. Accomplishing pre-defined goals or other game events within a particular video game title may trigger an issuance 110 of points to the user 104 from the service provider 102, thereby increasing the user's point total. By way of example, and not by way of limitation, this may include completing levels, unlocking new game features, achieving certain completion percentages, and potentially any accomplishment that may be defined in a video game title. In some aspects, accomplishments that earn metagame points for a user may be tailored to a particular gaming title, while yet further accomplishments may be defined across a plurality of different gaming titles. By way of example, and not by way of limitation, an accomplishment may be defined across a plurality of different gaming titles having similar characteristics, such as different titles of a similar game genre (e.g. sports games, fighting games, etc.), different titles belonging to similar franchises (e.g., different sequels and spinoffs for a particular first person shooter franchise), or different titles that are published by a common game publisher. User actions that cause point totals to change may also include other game activities, including, e.g., authenticating a game for the first time, leaving a hint for another user, and more. Further still, user actions outside of the execution of a particular gaming title may earn points, such as purchasing an item from a store, interacting with a social networking service, and more. Moreover, user actions that cause users to earn points may be pre-defined by various entities, such as, e.g., game developers during development of a game title, a metagame service provider, and/or sponsors.

According to further aspects, a video game platform may support multiplayer gaming 112 between users 104, and points may be issued or allocated to users based upon an outcome of a multiplayer game. In some implementations, multiplayer gaming 112 may involve each user 104 having a point stake in the outcome of a multiplayer gaming session, in which case points may be transferred between users based on pre-defined point stakes in the outcome of a game event, e.g., transferred from one or more losing users' accounts to one or more winning users' account of the gaming session. In some implementations, a pre-defined stake in the outcome of a match may be a user-defined point wager, in which case the users may be able to freely define an amount of points at stake in a particular gaming session. In yet further implementations, a pre-defined stake in the outcome of a match may be defined by another entity, such as, e.g., the service provider 102 or a game publisher (not pictured).

In some implementations, the points earned by a user may further be redeemable at the discretion of the user. Accordingly, the users 104 may further redeem points with the service provider for various rewards 108, as supported by the network 100. Rewards may include various items of interest, such as, e.g., discounts, game add-ons, and other items of interest. In some implementations, the network 100 may further support other point transfers 116 outside of a particular gaming session, such as, e.g., gifts to other users, sending points to a user in exchange for gaming hints or other items, and more.

According to further aspects of the present disclosure, points allotted to users 104 may be further sponsored by one or more sponsors 106 other than the service provider 102.

The sponsors 106 may include, e.g., advertising sponsors, game publisher sponsors, and more. Users 104 may acquire sponsored points 118a based on a variety of actions which may be defined by the sponsors 106, such as, e.g., clicking on an ad, visiting/interacting with a publisher's social networking page, and more. Because in some implementations the points may be redeemable for rewards from the service provider 102, the sponsors may also provide compensation 118b to the service provider 102 for the sponsored points.

Figure 2:
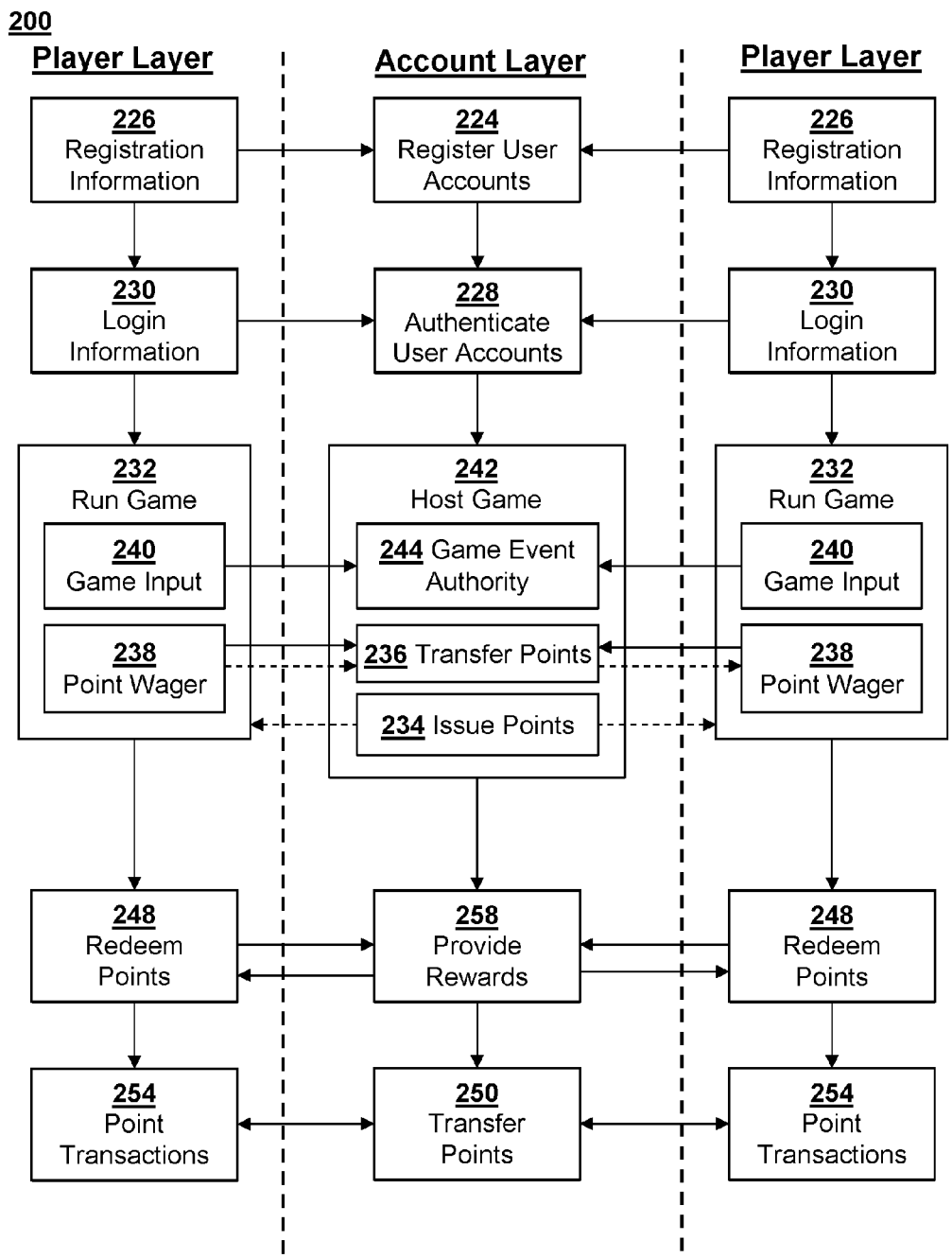
FIG. 2 is a flow diagram depicting a method of account management for a metagame in accordance with aspects of the present disclosure.

Aspects of the present disclosure include computing systems configured to implement a point system in accordance with various aspects of the present disclosure, such as, e.g., a point system in accordance with the network 100 depicted in FIG. 1. FIG. 2 depicts a flow diagram of an illustrative method 200 in accordance with aspects of the present disclosure. The method 200 may be implemented by a plurality of computing systems connected over a telecommunications network, and may include user account layer functionality, as well as player layer functionality.

The method 200 may include the registration of user accounts 224 with the point system upon receipt of registration request information 226 from each player wishing to participate in the point system. In some implementations, registration with the metagame point system may be tied to a fee, such as a periodic subscription fee or a one-time fee. Before any particular gaming event in which points may be issued to a user or transferred between users, the system may authenticate each user account 228 for the users playing the game upon receipt of login information 230 from the player. In some implementations, information regarding a past offline gaming event may be associated with a user account upon establishing a network connection and logging in the user.

During an authenticated gaming session, the method 200 may include executing various point metagame functionality in addition to core game play during running of the game 232. This may include storing user point totals, e.g., in a database having each point total associated with a corresponding user account, and changing the users' point totals based on various user actions.

Changing users' point totals may be based on information received regarding user actions input into a computing device, wherein the user's actions that cause changes in point totals are authenticated with the corresponding user account. This may include issuing points to users 234 based upon game events occurring during execution of the video game in a computing device. By way of example, and not by way of limitation, game events that trigger an issuance of points may include the user accomplishing pre-defined goals within the video game, such as completing a level, beating a challenge, and virtually any other definable game play accomplishment. In some implementations, point issuances may be overlaid onto an existing in game meta-goal award system, such as an existing trophy, achievement, scoring, or other meta-goal system. By way of example, and not by way of limitation, some or all of the game events that trigger an award of some trophy, achievement, or other award may also trigger the issuance of points, and these points may be transferable between users and/or redeemable for rewards, which may contrast with the existing meta-goal award system and provide an additional layer of player involvement in a metagame on top of less tangible satisfaction associated with merely achieving a high score.

Aspects of the present disclosure may also include computer functionality that supports transferring points between users 236 based upon outcomes of multiplayer gaming events, which may include decreasing a point total for one or more user accounts and increasing a point total for one or more other user accounts. This may be performed based upon a pre-defined point stake in the outcome of a gaming match, e.g., between users or teams of users. In some implementations, the system may further support user-defined wagers 238 which allow each of the users to define an amount of the points at stake during game play 232. In yet further implementations, the system may further include functionality that supports incongruous wagers between users. This may be desirable, for example, to support situations in which users are mismatched in skill. For example, a lesser player may wish to wager a smaller amount of points when facing a better player so that the potential point reward for achieving a favorable outcome justifies the likelihood of losing.

Implementations of the present disclosure may also include the computer functionality that may support core gameplay features during the execution of a video game 232. This may include a user interface that supports receiving gaming inputs 240 to control aspects of core video game play during the running of the game 232. This may also include hosting online multiplayer gaming 242 between two or more video game systems connected over a network, e.g., by hosting of a gaming server that exerts authority over game events 244 in a common running of the multiplayer game by receiving player inputs 240 over a telecommunications network as well as sending game event information to computing devices local to each user.

The method 200 may include providing tangible rewards 258 in exchange for points earned by the user. This may include receiving information regarding a redemption request 248 sent at the discretion of a user and reducing a total amount of points of the user account authenticated with the redemption request by a pre-determined point amount of the reward. The provided rewards may include any of a variety of items. By way of example, and not by way of limitation, rewards may include items of digital content, such as games, music, movies, game add-ons, themes, avatars, avatar accessories, early/exclusive beta access, and more, as well as discounts on items available at an online store. The provided rewards may also involve third parties, such as providing a financial donation to an entity, such as a charity or a crowd funded project selected by the user in exchange for the user's points. This may involve causing the donation to be sent to the entity in response to a redemption request containing information regarding selected entity from a pre-determined list of entities supported in the rewards program.

In some implementations, the method 200 may also include other point transfers 250 not tied to user actions during in game events. By way of example, and not by way of limitation, this may include point donations and gifts between users according to point transfer requests 254. By way of further example, the point transfers may include other transactions between users, such as, e.g., by permitting the users transfer points to a user in exchange for hints from the user, in exchange for digital content such as game items earned by the user, or other for other items. By way of further example, the users may be able to simply purchase points, if desired.

Aspects of the present disclosure further include various ways of instituting player interactions with the point metagame. FIGS. 3A-3E are schematic diagrams of graphical user interfaces (GUI) that illustrate various in-game lobbies configured to facilitate metagaming with a point system in accordance with aspects of the present disclosure.

Figure 3A:
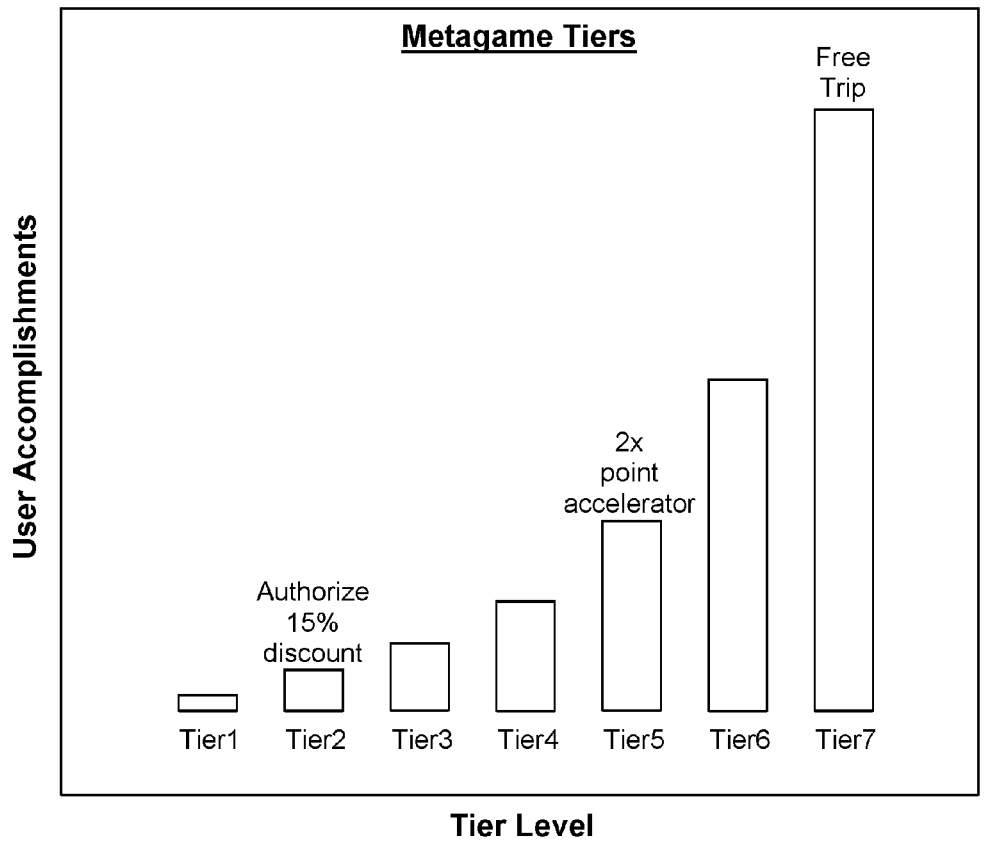
FIGS. 3A is a schematic diagram of a graphical user interface (GUI) depicting of a tiered award metagame in accordance with aspects of the present disclosure.

FIG. 3A depicts a GUI illustrative various aspects of a metagame in accordance with the present disclosure. The GUI of FIG. 3A depicts a tiered award system that may be integrated with a point metagame in implementations of the present disclosure. The tiered award system may be tied in with user accomplishments in the same or a similar manner as the point system and may be utilized to providing additional metagame aspects in conjunction with the point system according to aspects of the present disclosure. The tiered award system of FIG. 3A may be tied into a point reward system by making certain redeemable rewards available only upon reaching a pre-determined tier (e.g., reaching Tier2 may a pre-determined discount in an online store authorized to the user account). The tiered award may also provide certain non-redeemable rewards (i.e. without requiring the user to give up any points or without requiring any point reduction in a user's account to receive the reward) upon reaching a tier. Moreover, these non-redeemable rewards may be further integrated with the point system metagame by providing point rewards upon reaching a certain tier. By way of example, and not by way of limitation, reaching a certain tier may cause the user to earn more points at a faster rate (e.g., a point accelerator that causes the user to earn points at rate that is double the normal rate), or may simply trigger an issuance of points to the user.

In some implementations, a tiered award system may be published for each user account, while a user's point total may be hidden from other users, so that other users can compare status in an easily digestible format (e.g., a higher tier may indicate a greater level of player skill). This may be further integrated into with point system by providing a metric for the users to determine another player's skill. For example, a user may wish to risk a lower point wager in a head to head matchup if the user's opponent has a high status, and vice versa. Moreover, a user may wish to obtain gaming hints from another user in exchange for points if the other user is in a tier indicating a high level of skill, and thus a high likelihood that the other user's hints would be helpful.

FIG. 3B depicts an illustrative implementation of a GUI depicting an online multiplayer challenge involving a proposed wagers and counter wagers for a head to head challenge with congruous user-defined wagers. As depicted in the FIG. 3B, the system may support proposed wagers and counter wagers between users wishing to participate in a multiplayer game. In the illustrated example, upon acceptance of the 500 point counter challenge by the other user, the point metagaming system may be configured to add 1000 points to the winning user's account and reduce the losing user's account by 500 points, with these amounts corresponding to the wagers input by the users.

FIG. 3C depicts another illustrative example of a GUI depicting an online multiplayer challenge. The example depicted in FIG. 3C is similar to the challenge request depicted in FIG. 3B, but the system is configured to accept incongruous wagers between the users. Upon acceptance of the counter wager, the system may be configured to deposit 500 points into the winning user's account.

FIG. 3D depicts another illustrative example of a GUI depicting an online multiplayer challenge. The example depicted in FIG. 3D is a team multiplayer challenge in which each has a pre-defined point amount at stake in the multiplayer challenge. Upon winning the challenge, the points from all of the player participants may be pooled and distributed to the winning team, which may be deposited into the user accounts of each of the players of the winning team in equal amounts. The pre-defined 500 point stake depicted in the example of FIG. 3D may be user-defined wagers, or may be pre-defined by the system.

FIG. 3E depicts another illustrative example of a GUI depicting an online multiplayer challenge. The example depicted in FIG. 3E is a gaming tournament in which points are distributed to the first, second, and third place winners of the tournament. The example depicted in FIG. 3E is a bracket style single elimination tournament in which each participate is a single player, but it is noted that other tournament configurations are possible. In one implementation, the tournament may be a sponsored tournament, e.g., sponsored by a publisher of the game. Because the publisher may sponsor the points that get deposited into the winning users' accounts, the losing players may not need to put any of their points at stake in entering the tournament. In another implementation, the tournament may not necessarily be a sponsored tournament, and each user may wager a pre-defined amount of points to enter the tournament. It is further noted that the multiplayer gaming event depicted in FIG. 3E may not necessarily take place in a single gaming session.

Figure 4:
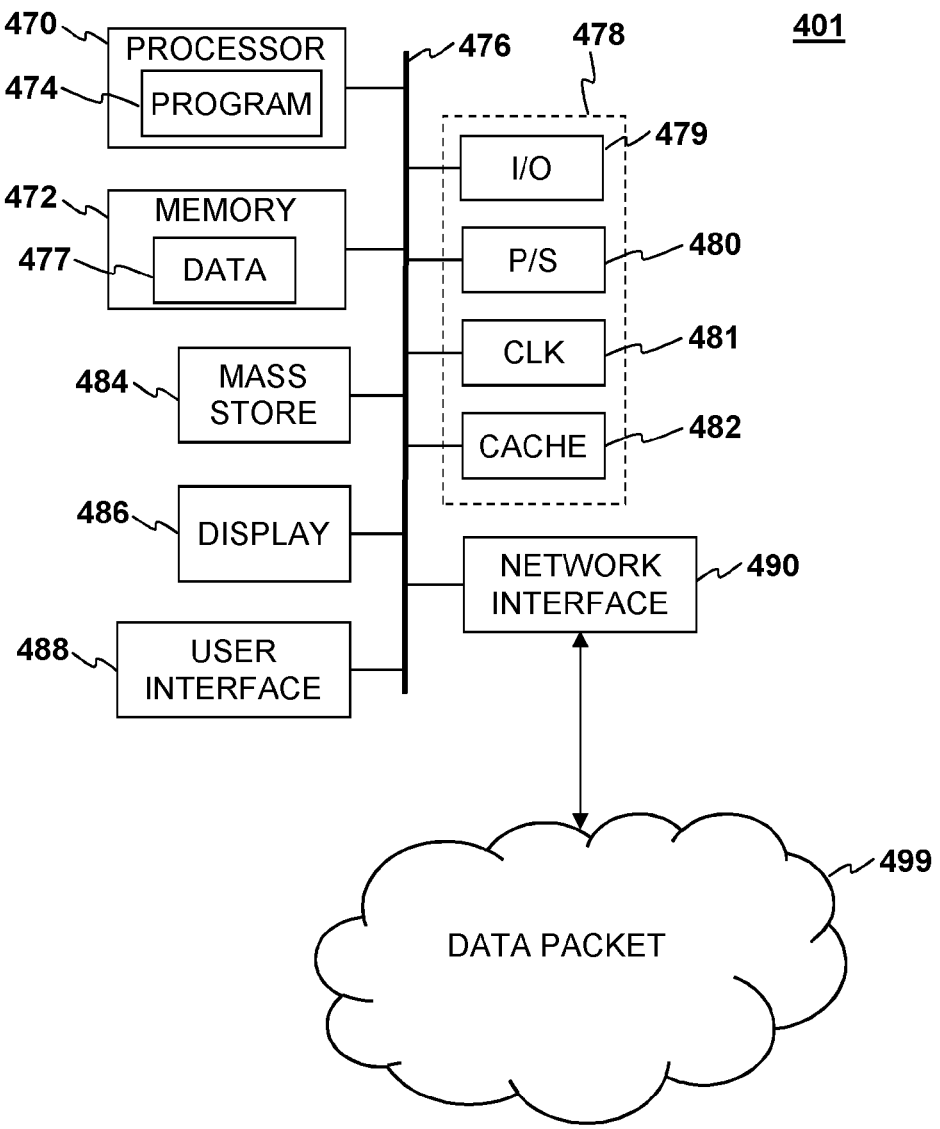
FIG. 4 is a schematic diagram of a computing system in accordance with aspects of the present disclosure.

According to aspects of the present disclosure method 200 or portions thereof may be implemented on a suitably configured computer system. FIG. 4A depicts an illustrative computer system 401 configured to implement one or more aspects of a metagame in accordance with the present disclosure. According to aspects of the present disclosure, the system 401 may be an embedded system, mobile phone, personal computer, tablet computer, portable game device, workstation, game console, and the like. Any of the computing devices and systems described herein, such as, e.g., computing devices 101a-e depicted in FIG. 1A, may have one or more features in common with the computer system 401 depicted in FIG. 4A.

The system 401 may include one or more processor units 470, which may be configured according to well-known architectures, such as, e.g., single-core, dual-core, quad-core, multi-core, processor-coprocessor, cell processor, and the like. The system 401 may also include one or more memory units 472 (e.g., RAM, DRAM, ROM, and the like). The processor unit 470 may execute one or more programs 474, portions of which may be stored in the memory 472, and the processor 470 may be operatively coupled to the memory 472, e.g., by accessing the memory via a data bus 476. The memory unit 472 may include data 477, and the processor unit 470 may utilize the data 477 in implementing the program 474. The data 477 may include, e.g., information regarding core game play as well as metagame data according to various aspects of the present disclosure. The program 474 may include instructions that, when executed by a processor, perform one or more operations associated with a video game or metagame, such as, e.g., a method having one or more features in common with the method 200 of FIG. 2.

The system 401 may also include well-known support circuits 478, such as input/output (I/O) circuits 479, power supplies (P/S) 480, a clock (CLK) 481, and cache 482, which may communicate with other components of the system, e.g., via the bus 476. The system 401 may optionally include a mass storage device 484 such as a disk drive, CD-ROM drive, tape drive, flash memory, or the like, and the mass storage device 484 may store programs and/or data. The system 401 may also optionally include a display unit 486. The display unit 486 may be in the form of a cathode ray tube (CRT), flat panel screen, touch screen, or other device that displays text, numerals, graphical symbols, or other visual objects. The system 401 may also include a user interface 488 to facilitate interaction between the system 401 and a user. The user interface 488 may include a keyboard, mouse, light pen, game control pad, touch interface, or other device.

A user, such as, e.g., a video game player, may participate in core game play and a metagame point system by interacting with the computer system through the user interface 488. Portions of the user interface 488 may include a graphical user interface (GUI) that can be displayed on the display unit 486 in order to facilitate user interaction with the system 401. The system 401 may include a network interface 490, configured to enable the use of Wi-Fi, an Ethernet port, or other communication methods. The network interface 490 may incorporate suitable hardware, software, firmware or some combination thereof to facilitate communication via a telecommunications network. The network interface 490 may be configured to implement wired or wireless communication over local area networks and wide area networks such as the Internet. The system 401 may send and receive data and/or requests for files via one or more data packets 499 over a network. The data 499 transmitted over the network may include any data that facilitates implementation of a metagame point system in accordance with the present disclosure, such as, e.g., information regarding game play events, gaming inputs, point redemption requests, redeemed rewards, point transfer requests, point wagers, or any combination thereof The data 499 sent over the network may be exchanged or accessed by another network connected computer system (not pictured) in order to implement aspects of the present disclosure in a distributed computing environment over a network. These components may be implemented in hardware, software, firmware, or some combination thereof.

Aspects of the present disclosure include networks of computing systems and devices configured to perform operations associated with a metagame point system.

Figure 5A:
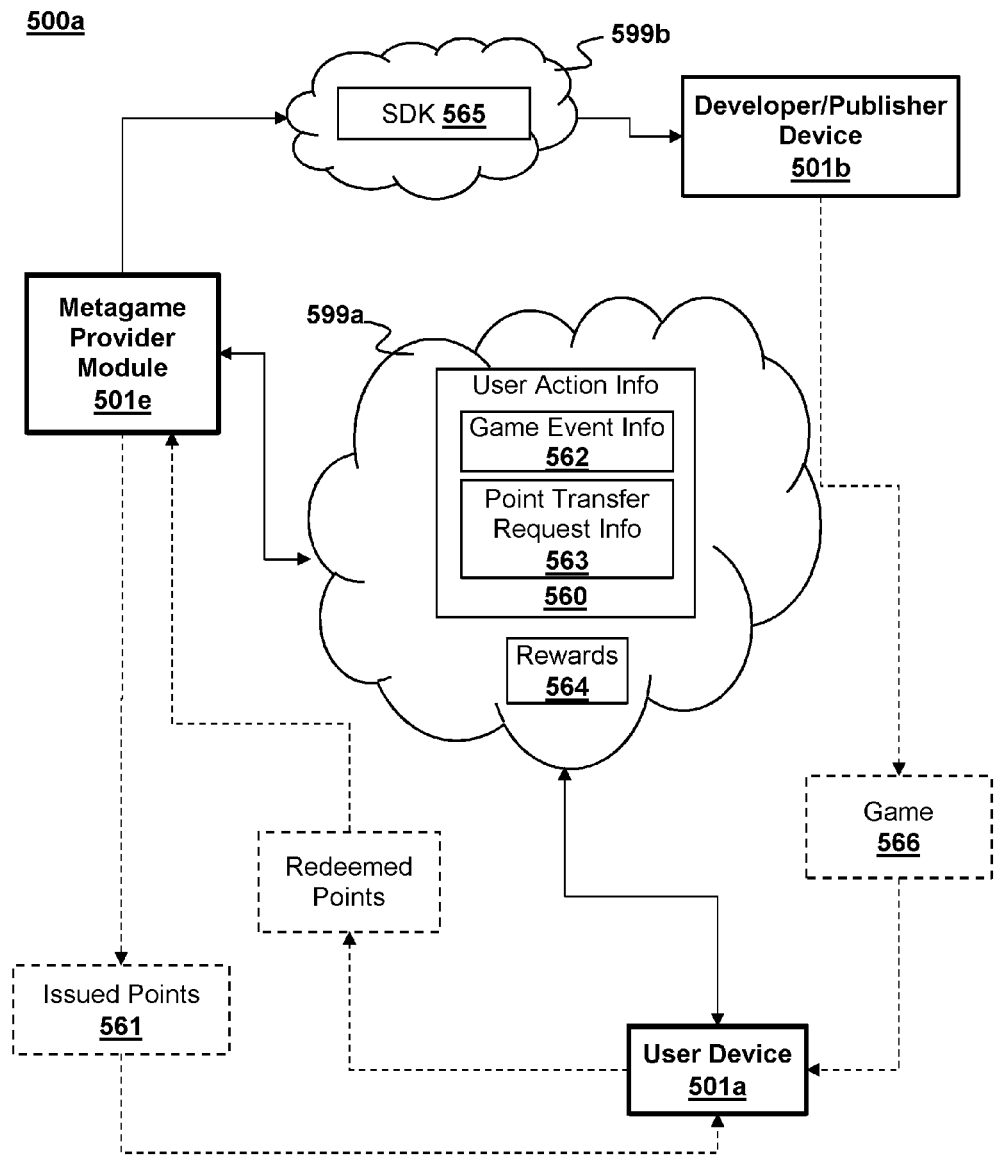
FIGS. 5A-5D are schematic diagrams of networks of computing devices in accordance with aspects of the present disclosure.
Figure 5B:
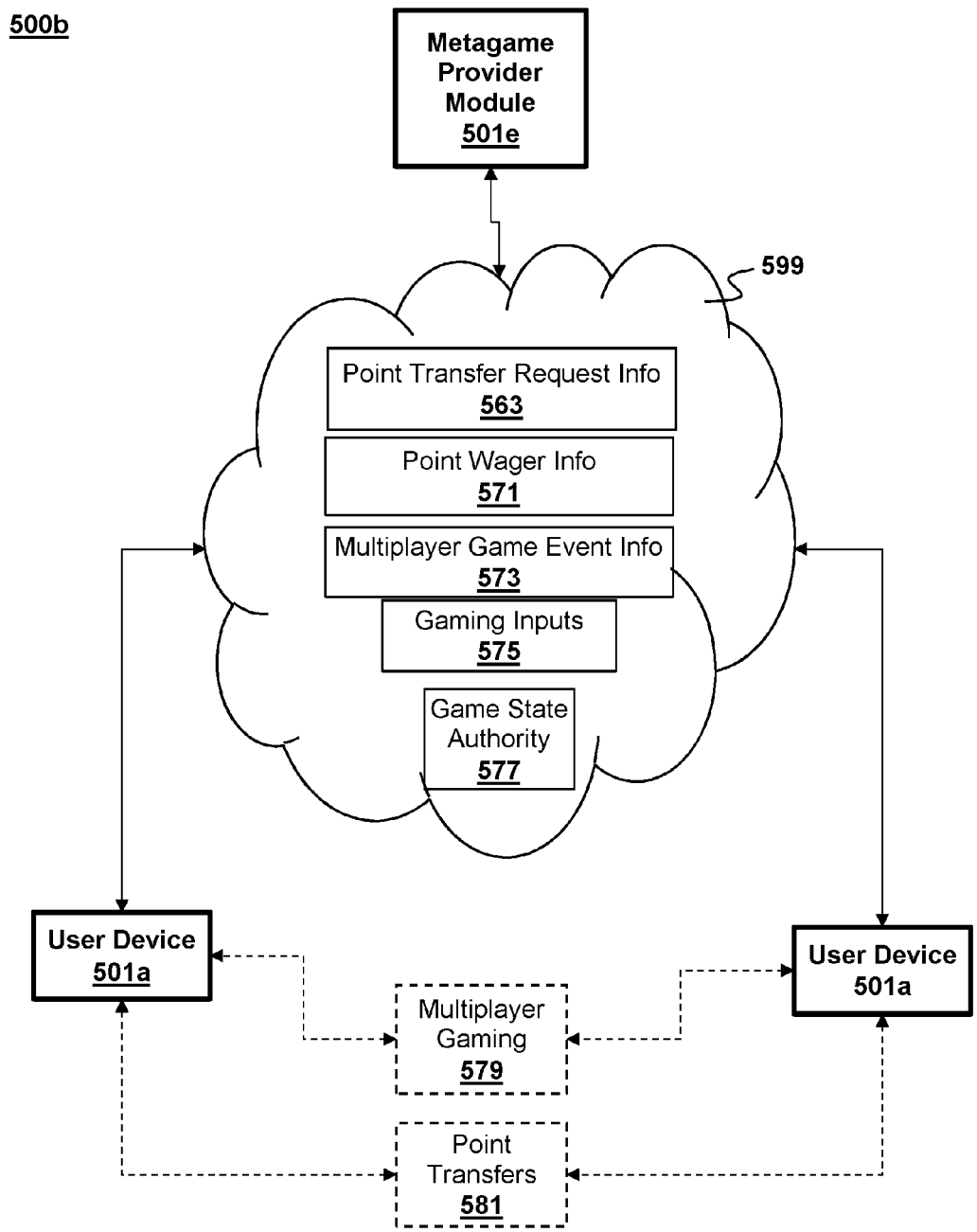
Figure 5C:
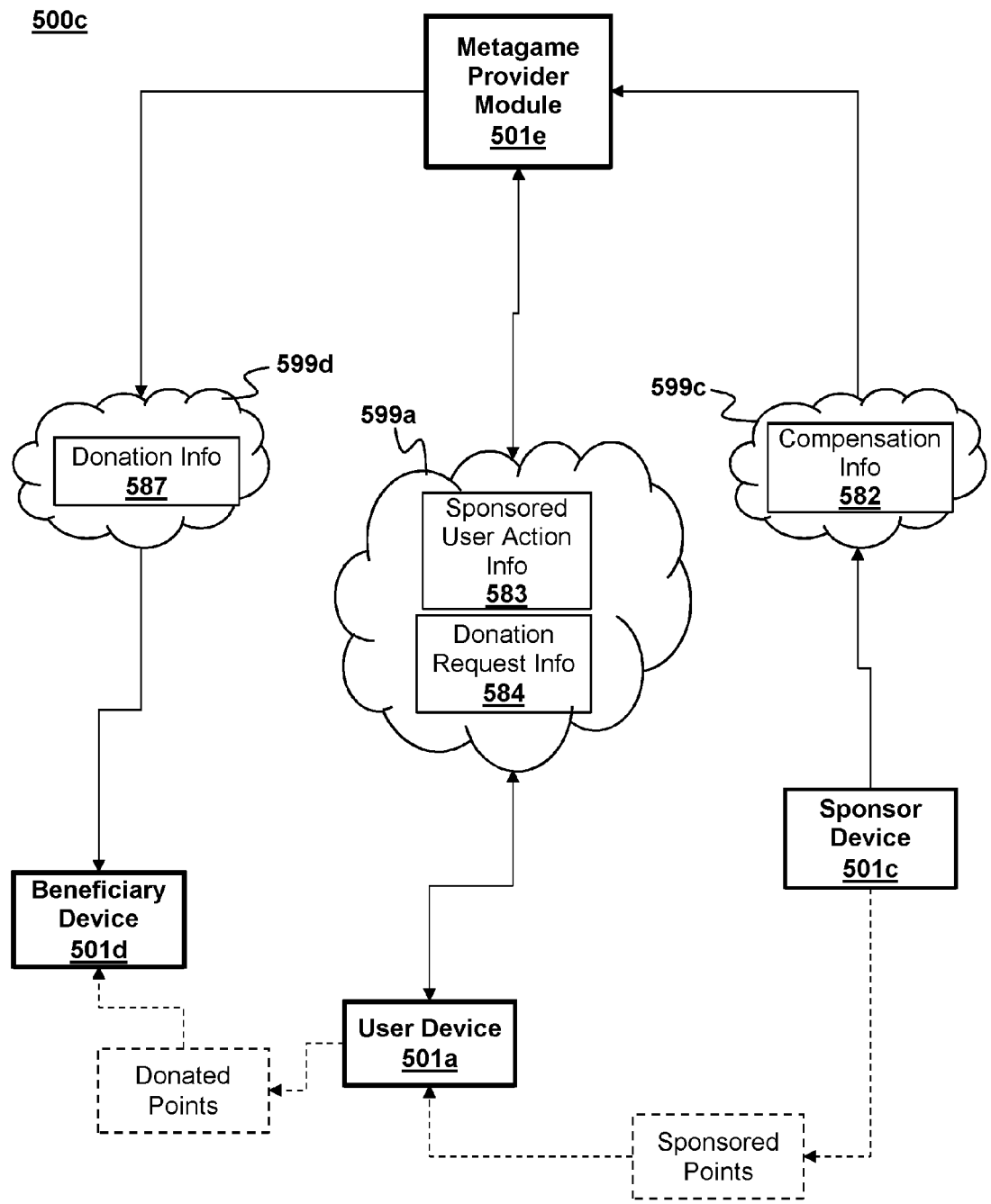

FIGS. 5A-5C depict aspects of a network 500a of computing devices configured to participate in various aspects of metagaming according to implementations of the present disclosure. Each of the computing devices 501a,b,e may have one or more features in common with the computing system 501 depicted in FIG. 4A. The computing devices may also have one or more features in common with the computing devices depicted in FIG. 1A.

FIG. 5A depicts aspects of a network 500a that includes one or more metagame service provider module 501e, one or more developer and/or publisher computing devices 501b, and one or more user computing devices 501a. In implementations of the present disclosure, the metagame provider module 501e may provide services related to a metagame for the other computing devices, e.g., as one or more dedicated metagame provider computing devices providing services in a client/server relationship, and/or as a cloud computing platform. In some implementation, the metagame provider module 501e may be implemented via suitable configuration in one or more of the other computing devices, e.g., via peer-to-peer software. In yet further implementations, the metagame provider module 501e may be implemented via any combination of the above, or in some other arrangement that facilitates execution of programming and data transfers in accordance with aspects of the present disclosure. By way of example, and not by way of limitation, the metagame provider module 501e may include one or more database servers for storing point totals and user account data associated with a metagame. The metagame provider module may also include one or more gaming servers for hosting online multiplayer game play between the user devices 501a in order to facilitate multiplayer gaming in conjunction with metagaming in accordance with aspects of the present disclosure. In yet further implementations, various server functionality may be hosted in the user client devices 501a. For example, portions of a database may be stored locally in user devices 501a as a distributed database, and/or multiplayer game hosting may be hosted locally in user devices 501a during gaming.

In order to facilitate aspects of a metagame, the network 500a may implement various developer/publisher data transfers 599b, which may be sent over a network. In order to facilitate the development of a point metagaming for any particular game title, the metagame provider 501e or other provider of a video game platform may provide a game developer with a software development kit (SDK) 565 that includes point metagame development tools as well as development tools for core game play. In some implementations, the SDK 565 may be provided directly to a developer/publisher device 501b through the electronic network, e.g., through a webpage or via other data transmission. The developer may use the SDK 565 to tailor various aspects of a metagame to a particular gaming title. By way of example, and not by way of limitation, this may include defining how point transfers may be implemented between users, what game events may trigger an issuance of points 561, and the like. This may also include tools for working with sponsors, such as, e.g., advertising sponsors, so that various sponsored actions that trigger an issuance of sponsored points may be defined in a game. The developer/publisher may then publish a developed video game 566 to make it available to users. In some implementations, the game 566 may be provided directly to the user over the network 500 through an electronic data transmission (not pictured), e.g., through an online store maintained by the publisher, metagame provider, and/or game platform provider.

In order to facilitate aspects of a metagame, the network 500a may implement various user device data transfers 599a. Users may interact with the user device 501a through a suitable user interface in the user device 501a. This may involve various user actions, and information regarding the user actions 560 may be received in a metagame provider module 501e. Some of these user actions may be predetermined to trigger an issuance of points 561 to the user, which may involve increasing a point total in the users account by an amount that corresponds to the user action. This user action information 560 may include information regarding game events 562 occurring during game play across different video game titles, such as, e.g., various pre-defined game accomplishments in the game 566, other games, as well as other information regarding user actions. The user information 560 may also include information relating to other forms of media, e.g., downloadable movies, videos, or music. A user could access such media as a reward in exchange for points. Alternatively, a user may receive points as an incentive for purchasing access to such media. The metagame provider module 501e may also receive information regarding requests by the users to redeem, donate, sponsor, wager, or otherwise transfer points 563. By way example, and not by way of limitation, information regarding a request to redeem points may include information relating to providing reward 564 to the user and reducing the user's point total by a corresponding amount.

FIG. 5B depicts aspects of a network 500b that includes a plurality of user devices 501a engaging in multiplayer game play and other communications in accordance with aspects of the present disclosure. In this example, the user devices 501a and a metagame provider module 501e are configured to implement various data transfers 599. The user devices 501a may exchange certain information with the metagame provider module 501e, e.g., as discussed above. Such information may include, but is not limited to point transfer request information 563, point wager information 571, multiplayer game event information 573, gaming inputs 575 and game state authority 577. This information may support multiplayer gaming 579 between the users, as well as point transfers 581 between the users in order to provide aspects of the metagame in accordance with the present disclosure.

It is noted that in some implementations, the user devices 501a may exchange information indirectly via communications with a dedicated metagame provide server, directly with each other bypassing a dedicated metagame provider device, or some combination thereof. Such information exchange may take place via the network 599 or may take place via a peer-to-peer network in which case aspects of the metagame provider module 501e may be hosted in the user's devices 501a. By way of example, and not by way of limitation, the user devices 501a may directly exchange multiplayer gaming information (e.g., game state, authority over in-game objects, game inputs). In some implementations, user devices 501a may implement direct point transfers.

FIG. 5C depicts aspects of a network 500c that includes one or more user devices 501a, one or more sponsor devices 501c and one or more beneficiary devices 501d engaging in point transfers and other communications supported by a metagame provider module 501e in accordance with aspects of the present disclosure. These devices may interact with each other to implement sponsoring or donating points as discussed above. In particular the user device 501a, sponsor device 501c, and beneficiary device 501d may engage in user device data transfers 599a, sponsor device data transfers 599c, and beneficiary device data transfers 599d, respectively with the metagame provider module 501e. By way of example, the sponsor device data transfers 599c may include transfer of compensation information 582 that identifies a sponsored action and a number of points that a sponsor is willing to donate to users who engage the sponsored action.

The user device data transfers 599a may include, but are not limited to, sponsored user action information 583 and donation request information 584. The metagame provider module 501e may receive sponsored user action information 583 may identify a particular sponsored action performed by the user through the user's device 501a (e.g., user completion of a sponsored challenge, or user participation or victory in a sponsored tournament in particular game title, user click of a sponsored advertisement, etc.), and the module 501e may adjust a corresponding point total for the users who complete the sponsored action based on the received sponsored user action information 583, thereby allowing the sponsor to provide points to the user via the metagame service hosted by the module 501e.

The user device data transfers 599a may also include donation request information 585, which may specify a particular beneficiary of the donated points and a corresponding beneficiary device 501d. The metagame provider module 501e may receive donation request information 584 from the user device 501a and provide a corresponding financial donation or funding to the beneficiary device 501d corresponding to the amount of points "donated" to the beneficiary, and the metagame module may decrease the user's point total by the corresponding amount of donated points. The beneficiary device data transfers 599d may include donation information 587, which may include points donated by a sponsor or user and, in some implementations, information identifying the donating sponsor or user. It is noted that aspects of the present disclosure include implementations in which the sponsor sponsors points for completing an activity and the points awarded are donated to the beneficiary in the name of the user who completes the activity.

Figure 5D:
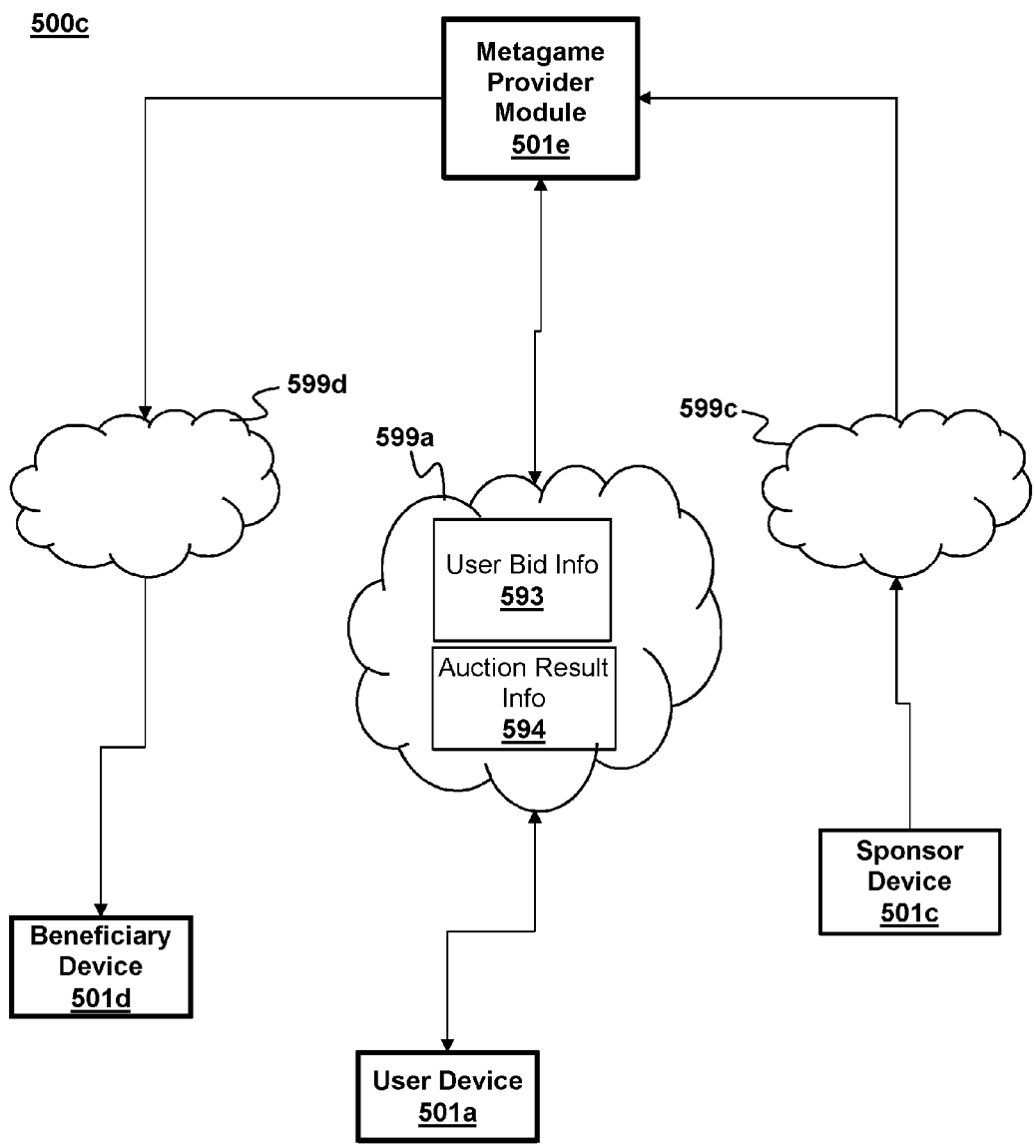

In some implementations, one or more users may participate in online auctions via one or more corresponding user devices 501a as shown in FIG. 5D. In such auctions users could bid points for exclusive digital or physical items. By way of example, and not by way of limitation, users have the opportunity to bid their points during a specified time frame from early access to a beta version of a game program or other application program. The user bidding the highest amount of points may be determined to be the winner. The item being auctioned and the time frame for the auction may be specified, e.g., by the metagame provider through a metagame provider device 501e, by a sponsor through a sponsor device 501c, by a beneficiary through a beneficiary device 501d, or by another user through a user device 501a. Bids for an item being auctioned may be received, e.g., by the metagame provider through a metagame provider device 501e, by a sponsor through a sponsor device 501c, by a beneficiary through a beneficiary device 501d, or by another user through a user device 501a. Likewise, the item being auctioned may be awarded to the winning bidder, e.g., e.g., by the metagame provider through a metagame provider device 501e, by a sponsor through a sponsor device 501c, by a beneficiary through a beneficiary device 501d, or by another user through a user device 501a. In the example illustrated in FIG. 5D, the metagame provider device 501e may receive bid information 593 from user devices 501a, determine the result and provide auction result information as indicated at 594. There are a number of variations on this scheme. For example, an item being auctioned may be awarded to the winning bidder's device by a sponsor through a sponsor device 501c and the point amount corresponding to the winning bid may be donated to a beneficiary though beneficiary device 501d. Such transactions may take place directly between the devices involved or may take place through an intermediary device, such as the metagame provide device 501e.

It is noted that implementations of the present disclosure are not limited by the physical locations of computing devices or the particular processors that execute particular programs or portions of programs that implement the metagame point system. The various devices participating in the system may be remotely connected to each other, e.g., through distributed computing, cloud computing, and the like, in accordance with well-known techniques. For example, various operations described as being implemented by the metagame device provider module 501e such as, e.g., by hosting multiplayer gaming, may be implemented in a client user device, such as a video game console or in a dedicated server. By way of further example, portions of a metagame point database may be stored in separate data stores, some or all of which may be remotely located relative to one another in a distributed storage network, or may be stored in a dedicated server of the metagame provider module.

Various features of the method and system described herein may be modified in many ways without departing from the scope of the present disclosure. For example, according to aspects of the present disclosure, points may be acquired upon performance of pre-defined user actions, which may include actions that are transparent to the users, as well as actions that are invisible to the user. For example, it may be transparent to the user, e.g., through a user interface, that achieving a certain accomplishment within a game will trigger an acquisition of points, and the user may choose to work toward that goal accordingly in order to earn those points. By way further example, certain point earning actions may be configured to be invisible to the user. This may include, for example, activity for which it is desired to create incentives for users to explore of features of a media title (e.g., a game) to seek out hidden rewards. As an example, but not a limitation, points may be awarded for a user who views or clicks on an advertisement without notifying the user of when or why the points were awarded. Alternatively, points may be awarded for random actions within a game.

According to another aspect, the system may be configured so that the points earned in game are applicable to various other non-game activities, such as discounts on other computer entertainment media titles, e.g., videos, movies, e-books, music, etc.

In yet another aspect, points may be used for crowdfunding of projects. This may involve the users sending their points to the particular project which they wish to fund, which may be implemented by redeeming their points in which case the service provider may donate appropriate funding to the crowdfunded project.

According to yet another aspects, points may be donated directly by the users, e.g., to charities without a specific request or invitation to do so. This may be accomplished with a system configured to accept a redeeming of the points. In some implementations the metagame service provider associated with the metagame provider device may act as an intermediary for transferring such donations to charities that have no associated beneficiary devices.

According to yet further aspects, points may be redeemable for both tangible and intangible rewards. Examples of intangible rewards may include free publicity for users who are particularly accomplished in game activities or are particularly generous in donating points to charities.

According to aspects of the present disclosure, a variety of different rewards may be provided upon a redeeming of points by a user account. Such rewards include, but are not limited to discounts on physical or downloadable items purchased from an online store associated with the metagame provider, downloadable content (e.g., movies, videos, music, e-books, etc.), or upgrades, enhanced features, unique virtual items, etc. for video games.

According to further aspects, an issued reward may be a financial donation or funding to a third party upon completion of an action specified by the metagame provider or a sponsor. By way of example, and not by way of limitation, this may include a donation to a charity selected by a user which the user may wish to support. By way of further non-limiting example, this may also include bestowal of an amount of funding to a particular project selected by the user which the user may wish to support.

While the above is a complete description of the various illustrative implementations of the present disclosure, it is possible to use various alternatives, modifications and equivalents. Therefore, the scope of the present invention should not be construed to be limited by the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-or-step-plus-function limitations, unless such a limitation is explicitly recited in a given claim using the phrase "means for" or "step for."

What is claimed is:

1. A computing system comprising:
   at least one processor unit;
   at least one memory unit coupled to the at least one processor unit;
   computer readable instructions embodied in the memory unit and executable by the processor unit, wherein execution of the instructions by the processor unit causes the computing system to perform a method, the method comprising:
   receiving information regarding user actions over a network, the information regarding the user actions being authenticated with a first user account, the user actions being performed through user inputs in at least one computing device; and
   changing a point total associated with the first user account based upon the received information regarding the user actions,
   wherein said received information regarding the user actions includes information regarding video game play across a plurality of different video game titles, the information regarding the video game play associated with the first user account,
   wherein said received information regarding the video game play includes information regarding an outcome of a multiplayer video game event,
   wherein the multiplayer video game event is hosted on a gaming server that exerts authority over game events in the multiplayer game, which is run on two or more computing devices local to each user that are under the authority of the gaming server, wherein the gaming server is configured to manage video game play across a plurality of different video game titles and interactive sessions, and
   wherein said changing the point total of the first user account includes transferring an amount of points between the authenticated first user account and at least one other user account based upon the outcome of the multiplayer video game event.

2. The computing system of claim 1, wherein the method further comprises:
   providing a reward corresponding to a point redemption request,
   wherein the point redemption request corresponds to an input by a user,
   wherein said receiving the information regarding the user actions includes receiving information regarding the point redemption request, and
   wherein said changing the point total of the first user account includes reducing the point total by an amount that corresponds to the point redemption request.

3. The computing system of claim 1, wherein said receiving the information regarding the video game play further includes receiving information regarding at least one user-defined point wager on the outcome of the multiplayer video game event, wherein the transferred amount of points is based on the received information regarding the at least one point wager.

4. The computing system of claim 3, wherein the at least one user-defined point wager includes a first point wager authenticated with the first user account, and at least one other point wager authenticated with the at least one other user account, wherein the other point wager is a different point amount from the first point wager.

5. The computing system of claim 1, wherein said receiving the information regarding the video game play further includes receiving information regarding an accomplishment in a single player video game event, and wherein said changing the point total includes increasing the point total of the first user account by a pre-determined amount of points for the accomplishment.

6. The computing system of claim 1,
wherein the multiplayer video game event is a tournament, the tournament having a pre-defined point reduction required for entry and a corresponding pre-defined point increase for at least one winner of the tournament,
wherein the at least one other user account is a plurality of other user accounts,
wherein the received information regarding the outcome of the multiplayer game event includes information identifying at least one of the first user account and the plurality of other user accounts as the winner of the tournament, and
wherein said transferring the amount of points between the first user account and the plurality of other user accounts includes decreasing a point total of the first user account and the plurality of other user accounts by the pre-defined point reduction required for entry and increasing a point total of the user account identified as the winner of the tournament by the pre-defined point increase amount.

7. The computing system of claim 2, wherein the reward is an item of digital content, and wherein said providing the reward includes making the item of digital content available to the first user account.

8. The computing system of claim 7, wherein the item of digital content is an item of additional game content for a video game title.

9. The computing system of claim 2, wherein the reward is a discount to an online store.

10. The computing system of claim 2, wherein the reward is a financial donation to an entity selected from a pre-determined list of entities, wherein said providing the reward includes causing the financial donation to be sent to the entity.

11. The computing system of claim 10, wherein the entity is a charity.

12. The computing system of claim 10, wherein the entity is an entity seeking funding for a crowd-funded project.

13. The computing system of claim 1,
wherein said receiving the information regarding the user actions includes receiving information regarding whether a user has performed a sponsored activity having a corresponding pre-determined point amount, and
wherein said changing the point total includes increasing the point total by the pre-determined point amount,
wherein the method further comprises:
causing an amount of financial compensation to be received from a sponsor of the activity,
wherein the amount of financial compensation corresponds to a pre-determined financial worth of the pre-determined point amount.

14. The computing system of claim 13, wherein the sponsor is an advertiser, and wherein the sponsored activity is a pre-defined user interaction with an advertisement.

15. The computing system of claim 13, wherein the sponsored activity is a pre-defined user interaction with a social networking page of the sponsor.

16. The computing system of claim 1, wherein said receiving the information regarding user actions includes receiving the information through a telecommunications network from at least one network connected computing device authenticated with the first user account.

17. The computing system of claim 16, wherein the at least one network connected computing device includes a video game console.

18. The computing system of claim 1, wherein receiving information regarding user actions includes receiving a bid of an amount of points in an auction.

19. The system of claim 1, wherein a user account is authenticated upon receipt of login information from a user.

20. The computing system of claim 1, wherein the gaming server comprises at least one of the two or more local computing devices.

21. A method comprising:
receiving information regarding user actions over a network, the user actions being performed through user inputs in at least one computing device; and
changing a point total associated with the first user account based upon the received information regarding the user actions,
wherein said received information regarding the user actions includes information regarding video game play across a plurality of different video game titles, the information regarding the video game play associated with the first user account,
wherein said received information regarding the video game play includes information regarding an outcome of a multiplayer video game event,
wherein the multiplayer video game event is hosted on a gaming server that exerts authority over game events in running the multiplayer game, wherein two or more computing devices local to each user are under the authority of the gaming server, wherein the gaming server is configured to manage video game play across a plurality of different video game titles and interactive sessions, and
wherein said changing the point total of the first user account includes transferring an amount of points between the authenticated first user account and at least one other authenticated user account based upon the outcome of the multiplayer video game event.

22. The method of claim 21, further comprising providing a reward to a user associated with the first user account upon a redeeming of an amount of points in the point total from the user.

23. The method of claim 21, further comprising providing a financial donation to an entity selected by a user upon a redeeming of an amount of points in the point total from the user.

24. The method of claim 21, wherein said receiving the information regarding the user actions includes receiving information regarding whether a user has performed a sponsored activity having a corresponding pre-determined point amount, and
wherein said changing the point total includes increasing the point total by the pre-determined point amount,
wherein the method further comprises receiving an amount of financial compensation from a sponsor of the sponsored activity.

25. The method of claim 21, wherein a user account is authenticated upon receipt of login information from a user.

26. A non-transitory computer readable medium having computer readable instructions embodied therein, the computer readable instructions being configured to implement a method when executed, the method comprising:
- receiving information regarding user actions over a network, the user actions being performed through user inputs in at least one computing device; and
- changing a point total associated with the first user account based upon the received information regarding the user actions,
- wherein said received information regarding the user actions includes information regarding video game play across a plurality of different video game titles, the information regarding the video game play being associated with the first user account,
- wherein said received information regarding the video game play includes information regarding an outcome of a multiplayer video game event,
- wherein the multiplayer video game event is hosted on a gaming server that exerts authority over game events in running the multiplayer game, wherein two or more computing devices local to each user are under the authority of the gaming server, wherein the gaming server is configured to manage video game play across a plurality of different video game titles and interactive sessions, and
- wherein said changing the point total of the first user account includes transferring an amount of points between the authenticated first user account and at least one other authenticated user account based upon the outcome of the multiplayer video game event.

27. The non-transitory computer readable medium of claim 26, wherein a user account is authenticated upon receipt of login information from a user.

* * * * *